Feb. 19, 1929.  E. BARTHELMESS  1,702,333
MEANS FOR SIMULTANEOUS DRYING AND GRINDING
Filed May 15, 1926

Inventor:
Emil Barthelmess

Patented Feb. 19, 1929.

1,702,333

UNITED STATES PATENT OFFICE.

EMIL BARTHELMESS, OF DUSSELDORF-OBERKASSEL, GERMANY.

MEANS FOR SIMULTANEOUS DRYING AND GRINDING.

Application filed May 15, 1926, Serial No. 109,345, and in Germany May 15, 1925.

Ordinary methods of simultaneous grinding and drying of materials, have the disadvantage that the bearings and other elements of the grinder are exposed to the high temperature of the drying fluid and detrimentally affected thereby.

The object of the present invention is to obviate this disadvantage by applying the drying process to a grinding apparatus wherein the materials are fed into a sifter which returns them through a grinder to the feeding conduit until sufficiently ground, and the invention consists in applying the drying fluid to the feeding conduit so that the return conduit through the grinder will remain unaffected by the fluid.

The drying fluid may be used as a means for driving the materials through the apparatus.

Figure 1:
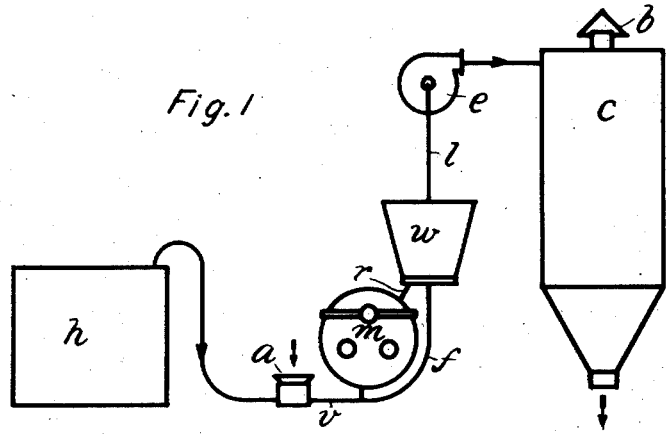
Figure 2:
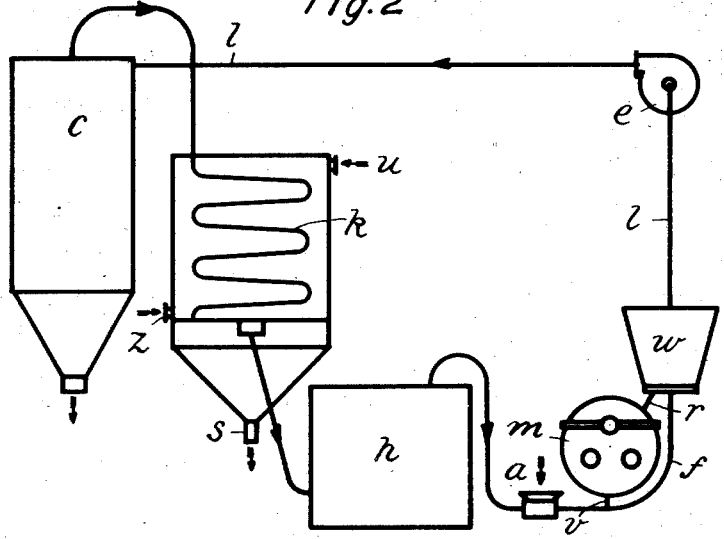

Fig. 1 of the accompanying drawings represents a diagrammatic view of a grinding and drying apparatus according to the invention, and Fig. 2 is a diagram of a modified arrangement.

In both arrangements there is a feeding conduit $f$ which leads, from a feeding device $a$, up into a wind sifter $w$. From the latter a conduit $l$ leads to a fan $e$ which draws the materials from the feeding device $a$ up into the sifter. Insufficiently ground materials are rturned by the sifter through conduits $r$ and $v$ and through a grinder $m$ to the feeding conduit, while the finer materials pass through the fan and are delivered by the latter into a separator $c$ where they are divided off from the air.

According to the invention the drying of the materials is effected in the feeding conduit $f$, and the grinder, which is not exposed to the drying fluid, will thus only receive surface-dried materials which, in breaking up, present fresh, moist surfaces for exposure to the drying fluid in the conduit $f$. In this manner the materials keep on circulating until they are sufficiently ground and sufficiently dried.

The fluid which drives the materials through the conduits may also be used for the drying of the same for which purpose it is passed through a heater $h$ before it enters the feeding duct $f$. In the arrangement according to Fig. 1 the moisture-laden fluid is is discharged through a flue $b$, while the dried and ground materials are discharged at the bottom of the separator $c$.

In the arrangement according to Fig. 2, the fluid is led from the separator $c$ to a condenser $k$ where it is cooled for the liberation of the fluid from its moisture. Cooling water enters the condenser at $z$ and leaves it at $u$. The water of condensation leaves the condenser at $s$, while the dry air or gas is returned to the heater $h$ for reheating and renewed circulation through the system.

I claim:

1. A method of drying and grinding coal and the like consisting in subjecting the materials to the action of a hot drying fluid, sifting the dried materials, grinding the coarse materials obtained in the shifting, and re-drying and re-sifting the ground materials together with the fresh materials.

2. A drying and grinding apparatus comprising a sifter, a feed pipe leading to said sifter, means for feeding materials through said pipe to the sifter, means for treating the materials with a drying fluid on their way to the sifter, a grinder, means for feeding the coarse materials from the sifter into the grinder, and means for feeding the materials from the grinder into said feed pipe.

3. A drying and grinding apparatus comprising a sifter, a feed pipe leading to said sifter, means for feeding materials into said pipe, means for feeding a fluid through said pipe so as to carry the materials to the sifter, means for heating the fluid, a grinder, means for feeding the coarse materials from said sifter into the grinder, and means for feeding the materials from the grinder into said feed pipe.

4. The structure claimed in claim 3 in combination with a condenser, means for feeding the fluid from the sifter into said condenser, and means for leading the fluid from the condenser back to the feed pipe.

5. A drying and grinding apparatus comprising a pipe circuit, a fan in said circuit for driving materials through the same by means of a fluid, a heater arranged in the circuit for heating said fluid, means for feeding materials into the pipe circuit behind the heater, a wind sifter arranged in the circuit between the feeding device and the fan, a grinder arranged outside the circuit so as to receive materials from the sifter and return them to the circuit, a separator arranged in the circuit so as to receive the fluid and the ground materials from the fan, and a condenser arranged in the circuit behind the separator for clearing the fluid of moisture before it is returned to the heater.

EMIL BARTHELMESS.